United States Statutory Invention Registration [19]

[11] Reg. Number: H616

Hartman [43] Published: Apr. 4, 1989

[54] METHOD OF MAKING A PRE-ALIGNED OPTICAL CORRELATOR

[75] Inventor: Richard L. Hartman, Huntsville, Ala.

[73] Assignee: The United States of America as represented by the Secretary of the Army, Washington, D.C.

[21] Appl. No.: 227,571

[22] Filed: Aug. 3, 1988

[51] Int. Cl.[4] ..... G02B 5/18

[52] U.S. Cl. ..... 350/162.13

*Primary Examiner*—Stephen C. Buczinski
*Assistant Examiner*—Linda J. Wallace
*Attorney, Agent, or Firm*—Freddie M. Bush; James T. Deaton

[57] ABSTRACT

A method of adjusting a laser diode relative to a solid optical correlator body to adjust the optical axis of the laser diode relative to a matched filter mounted in a predetermined position on the solid optical correlator body and then securing the laser diode in the predetermined position to provide an aligned optical correlator for receiving correlator signals from a predetermined scene to correlate the scene with that of the matched filter.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A PRE-ALIGNED OPTICAL CORRELATOR

DEDICATORY CLAUSE

The invention described herein may be manufactured, used, or licensed by or for the Government for governmental purposes without the payment to me of any royalties thereon.

BACKGROUND OF THE INVENTION

In the past, optical correlators have been made with discrete components which required many adjustments to align the optical train. After normal elements such as mirrors and lenses are aligned, the critical remaining issue unique to optical correlators is to adjust the Holographic Fourier Transform Matched Filter to the exact optical axis (zero spatial frequency Fourier Transform) of the laser beam. This unique alignment must be done to the order of a few micrometers. This is usually done in laboratory style correlators by having the matched filter placed in a microscopically adjustable holder.

Recently, an optical correlator based on a single block of glass has been fabricated in order to make it rugged. No alignment of the optical components is needed or possible yet the matched filter must still be aligned. This is difficult since it is inside the optical system. It is even more difficult to insert a mechanism for switching between multiple filters which is a desired function of matched filters.

Building a correlator utilizing a laser diode as the light source has complications in that the active emitting location on the diode is not accurately registered to the outside of the laser diode package.

Therefore, it is an object of this invention to provide a way for aligning each laser diode relative to the correlator structure and the matched filter of the correlator.

Another object of this invention is to provide a simple procedure in which a laser diode can be accurately mounted relative to a matched filter of a correlator.

Other objects and advantages of this invention will be obvious to those skilled in this art.

SUMMARY OF THE INVENTION

A method of making a pre-aligned optical correlator is provided in which a solid optical correlator has a laser diode as a light source and the method includes adjusting the laser diode relative to the solid optical correlator body so as to align the laser diode relative to the optical axis to bring the center of a matched filter to the optical axis of the beam from the laser diode and then securing the laser diode in a fixed position relative to the solid optical correlator body.

DESCRIPTION OF THE PREFERRED EMBODIMENT

Figure 1:
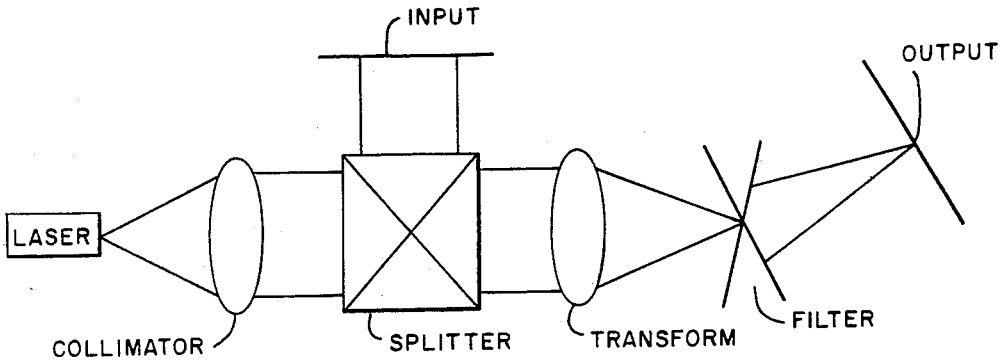
FIG. 1 is a schematic layout of the elements of an optical correlator.
Figure 3:
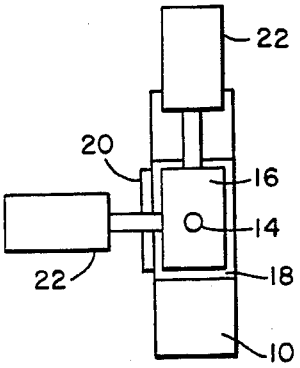
FIG. 3 is another illustration of the micrometers for adjusting the laser diode relative to the solid optical correlator body.
Figure 2:
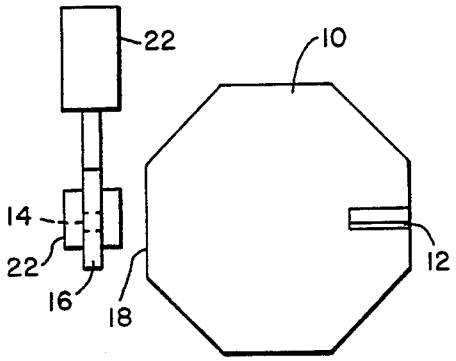
FIG. 2 is a view illustrating a solid optical correlator with a laser diode positioned relative thereto for being adjusted by micrometers.
Figure 4:
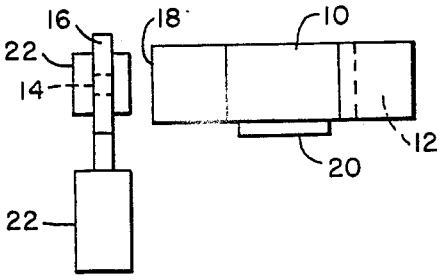
FIG. 4 is a view illustrating another position of the solid optical correlator in its relation to the micrometers for the laser diode.

Referring now to the drawing, an optical system in accordance with this invention utilizes a solid optical correlator that has three dimensional folding of the elements as illustrated in FIG. 1 so as to fit into a missile. As shown in FIGS. 2–4, these elements are folded into a solid optical body 10 that has the optical elements mounted thereon. Laser diode 14 and matched filter 12 have to be adjusted relative to each other and this adjustment of laser diode 14 relative to matched filter 12 is not independent. It has been discovered that as long as laser diode 14 and filter 12 are close enough to the optical axis to avoid distortion, it is possible to move laser diode 14 instead of matched filter 12 in order to bring the center of matched filter 12 to the optical axis of the beam produced by laser diode 14.

To mount laser diode 14 relative to optical correlator body 10, laser diode 14 has a body mounting plate 16 integral therewith for mounting laser diode 14 and a flat surface 18 on correlator body 10 is the surface on which laser diode 14 is to be mounted. A photopolymerizing polymer of conventional composition is placed on surface 18 and the facing surface of body mount 16 with body mount 16 and laser diode 14 being brought into contact with the photopolymerizer polymer on surface 18. Matched filter 12 has already been fixed into a fixed position relative to the correlator body before laser diode 14 is positioned relative to surface 18. The input to optical correlator 10 has a conventional modulator 20 as an input to the optical correlator for receiving an input sensor signal. With the input to modulator 20 completely blocked to present a blank scene as the signal input to the correlator, and with laser diode 14 on and transmitting its laser beam through the paths of optical correlator body 10 to matched filter 12, laser diode 14 and its supporting body 16 are adjusted by a plurality of micrometers 22 to adjust the location of laser diode 14 so that the zero frequency output is in the correct location for illumination of matched filter 12.

Once laser diode 14 is adjusted to align the axis of the laser diode to that of matched filter 12, the photopolymerizing polymer on surface 18 and on body mounting plate 16 is caused to harden by irradiating the photopolymerizing polymer with ultraviolet light. This permanently fixes laser diode 14 relative to correlator body 10 with the correct alignment of laser diode 14 relative to matched filter 12.

The exact procedure for adjusting laser diode 14 relative to matched filter 12 can be automated in a number of ways. That is, a pin hole can be placed in the correct position in matched filter 12 and micrometers 22 adjusted to position laser diode 14 until maximum light comes through the pinhole in matched filter 12 to a detector (not shown) which causes the ultraviolet light to flash and cause the photopolymerizing polymer at surface 18 to be polymerized and fix laser diode 14 relative to optical correlator body 10. Also, a pattern identical to the correlation reference image can be supplied at the input to the correlator and motorized micrometers 22 can then be adjusted to position laser diode 14 for maximum correlation intensity through matched filter 12. Once the maximum intensity is reached, the ultraviolet light is then flashed to fix laser diode 14 relative to optical correlator body 10. Other techniques as well can be used for determining the exact position needed for laser diode 14 relative to matched filter 12. Small errors in focus can also be accommodated by varying the spacing between laser diode body plate 16 and surface 18 of optical body correlator 10. The photopolymerizing polymer can be used to fill in moderate thicknesses in order to accommodate this adjustment. Also body plate 16 and laser diode 14 can be mounted on a fixture in such a way that it can be withdrawn and the surface of body mounting plate 16 coated with an appropriate cement and body plate 16 than placed back in the correct position needed for the setting of the cement such as photopolymerizing polymer or other cementing means.

I claim:

1. A method of making a pre-aligned optical correlator comprising: providing a solid optical correlator body that has flat surfaces thereon, providing a position on the solid optical correlator body to mount a matched filter, mounting a matched filter in a predetermined position relative to the provided position on said solid optical correlator body, positioning a laser diode relative to a predetermined surface of said correlator body for providing a laser beam in a predetermined path to a center position of said matched filter, adjusting said laser diode until the laser beam from said laser diode is centered relative to the center position of the matched filter, and securing said laser diode in said adjusted position relative to said optical correlator body to fix the laser diode relative to the optical correlator body.

2. A method of making a pre-aligned optical correlator as set forth in claim 1, wherein said laser diode is secured to said optical correlator body by photopolymerizing polymer and said polymer being caused to harden by exposing it to ultraviolet light after said laser diode has been adjusted to the desired position.

3. A method of making a pre-aligned optical correlator as set forth in claim 2, wherein said laser diode is adjusted relative to said optical correlator body by micrometers.

4. A method of making a pre-aligned optical correlator as set forth in claim 3, wherein said solid optical correlator body is provided with a modulator on a surface thereof for receiving a predetermined scene desired to be correlated.

* * * * *